Patented Apr. 4, 1944

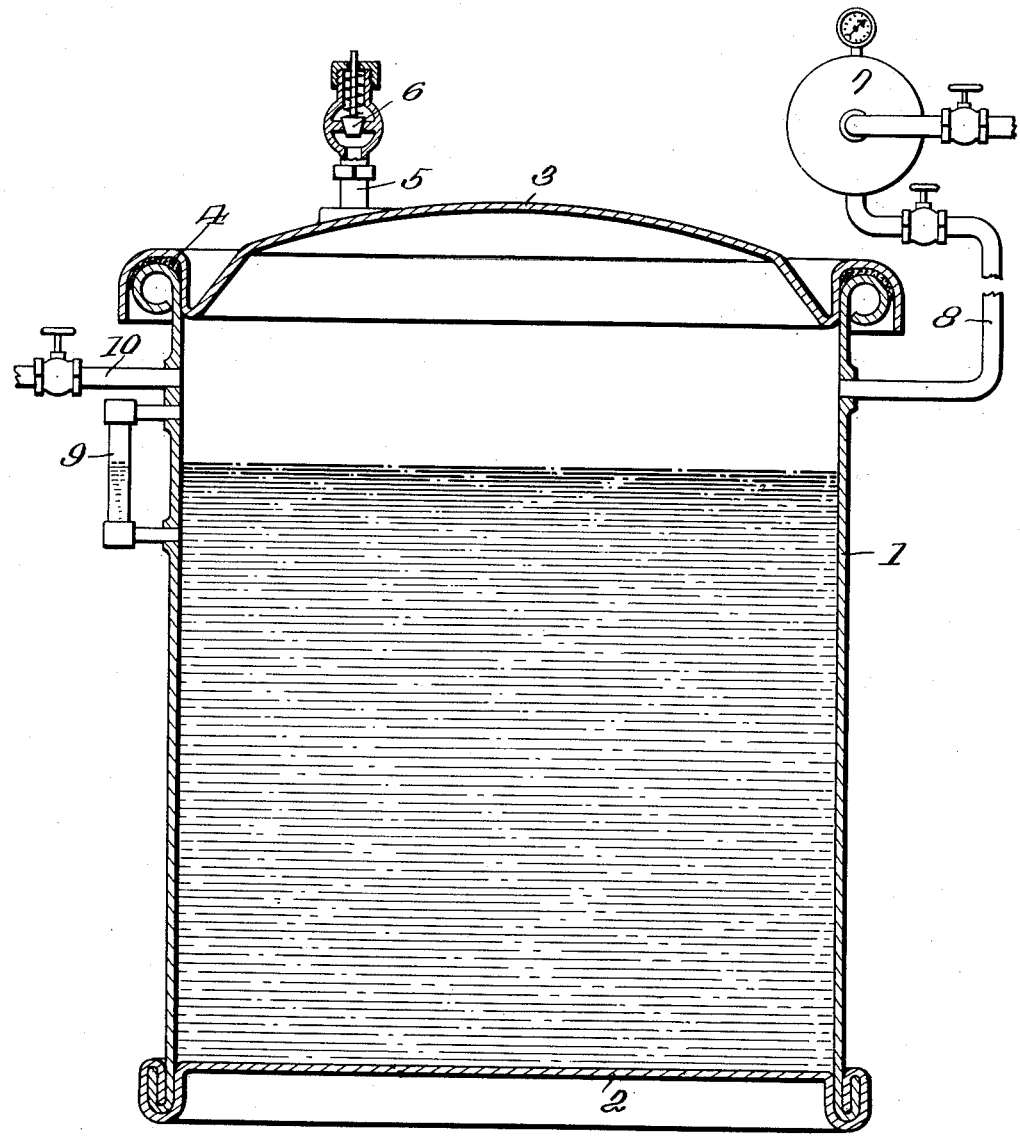

2,345,814

UNITED STATES PATENT OFFICE 2,345,814

METHOD OF PRODUCING AND STORING SAUERKRAUT

William H. Harrison, Wilmette, Ill., assignor to Continental Can Company, Inc., New York, N. Y., a corporation of New York Application April 27, 1942, Serial No. 440,691

2 Claims. (Cl. 99—154)

The invention relates to new and useful improvements in a method of producing and storing sauerkraut. In the usual method of making sauerkraut, the cabbage is shredded and mixed with a certain amount of salt and then packed in a tank. The salt draws the juices from the cabbage and produces a brine in which the cabbage ferments and is changed into a product known as sauerkraut. As the cabbage ferments there slowly accumulates over the surface of the brine a thin film which becomes increasingly thicker of an organism known as oidium. This organism is strictly an aerobe. It continues to grow as long as it remains on the surface of the brine where air can come in contact with it, but ceases to grow when it becomes immersed in the liquid. When the surface film of oidia is disturbed, the culture loses its buoyancy and drops down in the brine and contaminates the surface of the kraut being formed, producing a flavor suggestive of putrefaction. Often, under the present practice of producing and storing kraut, the kraut is left in the tanks and the brine evaporates so that the oidia layer comes in contact with the kraut and thus spoilage is effected.

An object of the present invention is to provide a method of producing and storing kraut wherein the accumulation of a thin film known as oidium is avoided, both during the fermentation step and during the storage of the kraut after the treatment is over.

In the drawing there is illustrated diagrammatically a tank which may be used in carrying out the improved method of producing kraut and in which the kraut may be stored for an indefinite period without spoilage.

The apparatus illustrated includes a tank made from wood or metal and may be of any desired dimensions. The tank includes a body portion 1 to which a bottom end 2 is secured by seaming or otherwise so as to make a tight joint. The kraut is produced and stored in this tank 1. The cabbage from which the kraut is to be made is cleaned and shredded in the usual way, and then mixed with approximately two percent by weight of salt. It is preferable to mix the salt with the cabbage before it is placed in the tank in order to more thoroughly distribute the salt, but the cabbage may be placed in the tank in small amounts, followed by a small amount of salt and so on until the cabbage and salt thoroughly mixed therewith nearly fill the tank.

The cabbage may be warmed before it is put in the tank, if it is desired to facilitate fermentation. The tank is then closed by a cover 3 with which is employed a sealing gasket 4, and suitable means (not shown) for clamping the cover in sealing engagement with the tank. The tank is provided with an outlet 5 in which is located a valve 6 of any suitable character, which is maintained closed against the entrance of air into the tank, and which will open when the pressure on the tank is built up to more than one-half inch water pressure. The tank is sealed as soon as the cabbage is placed therein and is maintained in sealed condition, not only throughout the fermentation of the cabbage to produce the kraut, but during the storage of the kraut in the tank. When fermentation sets in, $CO_2$ gas is released, and this is heavier than air and will force the air in the head space out through the valve 6. When the cabbage is placed in the tank, a relatively large head space is provided, and all air is forced out of this head space by the $CO_2$ gas generated during fermentation of the cabbage in the production of the kraut.

Oidia will not grow on the brine as long as the carbon dioxide excludes air from contact with the surface of the brine. Therefore, there is no forming of a film of oidium which will continue to grow and which will cause spoilage of the kraut if brought into contact therewith.

As noted above, the kraut is left sealed in the tank until it is desired to use the same. When the fermentation ceases, the production of kraut is completed. The time when fermentation ceases can be determined by the escape of gas through the valve 6. After fermentation of the kraut has ceased, and the temperature becomes reduced, it is necessary to supply carbon dioxide to the head space so as to prevent the formation of a vacuum which might result in causing air to enter the head space. A tank 7 is provided for supplying $CO_2$ gas through a pipe 8 to the head space. An automatic valve may be used so that the head space will be maintained filled with the $CO_2$ gas and held at a one-half inch pressure. The valve 6 is so adjusted, as noted above, so that it will not be opened to permit the escape of the $CO_2$ gas until the pressure thereon develops to an extent above one-half inch water pressure, thus the $CO_2$ gas is not wasted.

During the active fermentation of the sauerkraut, there is an excess of brine. However, after fermentation is practically arrested, the kraut will usually need an additional supply of brine in order that it may be kept immersed in the brine. The tank is preferably provided with a suitable gauge 9 so that the level of the brine in the tank can be determined, and if it is found necessary to supply more brine, a two percent salt solution is permitted to enter the tank from the pipe 10 until the desired level is obtained. The relieving of the sealed tank of air or oxygen and the running in of the carbon dioxide when needed, and also the brine when needed, can all be carried out under anaerobic conditions through the gas-tight cover which is attached to the tank and the outlet valve 9, which permits the air to escape from the head space, but prevents it entering the head space.

It will be apparent from the above that a method of producing and storing kraut has been provided wherein the kraut is at all times maintained free from contact with air, and therefore, the tank is free from oidia and other spoilage organisms which require air for their growth. The kraut produced by this method and stored in the manner stated is free from off-flavor, due to the growth of aerobic organisms. Furthermore, it would be practicable to store the kraut in tanks from one year to another without appreciable deterioration.

It is obvious that other forms of inert gas may be supplied to the head space in order to prevent the formation of a vacuum and the entrance of air into the head space. It is also obvious that any suitable means may be employed for maintaining the cabbage submerged in the brine during treatment and storage. It is further obvious that minor changes in the details of the steps of the method may be made without departing from the spirit of the invention as set forth in the appended claims.

Having thus described the invention, what I claim as new and desire to secure by Letters Patent is:

1. The method of producing and storing sauerkraut consisting in placing shredded cabbage thoroughly mixed with approximately two percent of salt by weight in a tank leaving a relatively large head space, sealing the tank with a closure member having a valve opening outward so as to prevent air from entering the tank while permitting the gas formed during fermentation to force the air out of the head space and escape, maintaining said tank in sealed condition for storing the kraut after treatment and supplying carbon dioxide gas to the head space within the tank so as to maintain a slight pressure thereon and prevent air from entering the head space whereby the kraut is at all times during fermentation and during storage maintained free from contact with air.

2. The method of producing and storing sauerkraut consisting in placing shredded cabbage thoroughly mixed with approximately two percent of salt by weight in a tank leaving a relatively large head space, sealing the tank with a closure member having a valve opening outward so as to prevent air from entering the tank while permitting the gas formed during fermentation to force the air out of the head space and escape, maintaining said tank in sealed condition for storing the kraut after treatment and supplying carbon dioxide gas to the head space within the tank so as to maintain a slight pressure thereon and prevent air from entering the head space, and supplying said tank with a two percent brine solution when found necessary whereby the kraut is at all times during fermentation and during storing of the same maintained free from contact with the air and submerged in brine.

WILLIAM H. HARRISON.